(12) United States Patent
Hibble

(10) Patent No.: US 8,480,891 B2
(45) Date of Patent: Jul. 9, 2013

(54) FILTER ASSEMBLY

(75) Inventor: Barry F. Hibble, New Castle, NH (US)

(73) Assignee: Micronics, Inc., Portsmouth, NH (US)

( * ) Notice: Subject to any disclaimer, the term of this patent is extended or adjusted under 35 U.S.C. 154(b) by 406 days.

(21) Appl. No.: 12/558,151

(22) Filed: Sep. 11, 2009

(65) Prior Publication Data

US 2010/0065513 A1    Mar. 18, 2010

Related U.S. Application Data

(63) Continuation-in-part of application No. 11/274,823, filed on Nov. 14, 2005, now Pat. No. 7,635,132, which is a continuation-in-part of application No. 10/676,322, filed on Sep. 30, 2003, now Pat. No. 6,971,526.

(60) Provisional application No. 60/414,718, filed on Sep. 30, 2002.

(51) Int. Cl.
*B01D 25/176* (2006.01)
(52) U.S. Cl.
USPC ............ 210/229; 210/230; 210/231; 210/499
(58) Field of Classification Search
USPC .................. 210/224, 227, 229, 230, 231, 499
See application file for complete search history.

(56) References Cited

U.S. PATENT DOCUMENTS

| | | | |
|---|---|---|---|
| 2,715,965 A | 8/1955 | Carver | |
| 4,486,305 A | 12/1984 | Nakamura | |
| 4,722,789 A | 2/1988 | Kupka | |
| 4,765,859 A | 8/1988 | Heath et al. | |
| 4,883,592 A * | 11/1989 | Kurita et al. | 210/227 |
| 4,964,986 A | 10/1990 | Davis | |
| 6,007,717 A | 12/1999 | Hayhurst et al. | |
| 6,149,806 A | 11/2000 | Baer | |
| 6,180,002 B1 | 1/2001 | Higgins | |

(Continued)

FOREIGN PATENT DOCUMENTS

| | | | |
|---|---|---|---|
| DE | 2322452 A * | 1/1974 | |
| DE | 29923857 U1 | 8/2001 | |

(Continued)

OTHER PUBLICATIONS

International Search Report and Written Opinion for Application No. PCT/US10/48649, dated Oct. 28, 2010.

(Continued)

*Primary Examiner* — Matthew O Savage
(74) *Attorney, Agent, or Firm* — Nelson Mullins Riley & Scarborough LLP; Anthony A. Laurentano

(57) ABSTRACT

Apparatuses and methods for making and using a filter cloth assembly are described. A filter cloth assembly can have a liquid permeable filtering media attached to a connector ring. The liquid permeable filtering media separates at least one solid from at least one liquid in a slurry. The filtering media has a feed hole formed therein to allows passage of a slurry through the filtering media. The connector ring includes a flange having an upper flange section and a lower flange section. The lower flange section receives an edge of the feed hole to connect the filtering media to the connector ring such that the face of the filtering media is substantially flush with the upper flange section.

8 Claims, 10 Drawing Sheets

U.S. PATENT DOCUMENTS

| | | |
|---|---|---|
| 6,971,526 B2 | 12/2005 | Hibble |
| 2004/0112818 A1 | 6/2004 | Hibble |
| 2006/0131224 A1 | 6/2006 | Hibble |

FOREIGN PATENT DOCUMENTS

| | | |
|---|---|---|
| FR | 1593016 | 7/1970 |
| WO | 93/18838 A1 | 9/1993 |
| WO | WO-96/24423 A1 | 8/1996 |
| WO | WO-2005/046837 A1 | 5/2005 |

OTHER PUBLICATIONS

Supplementary European Search Report for Application No. 06826964, dated Dec. 30, 2009.

Canadian Office Action for Application No. 2,629,386, dated Jun. 20, 2011.

European Search Report for Application No. 03759674.9, dated Oct. 4, 2006.

International Search Report for Application No. PCT/US06/42145, dated Aug. 29, 2007.

* cited by examiner

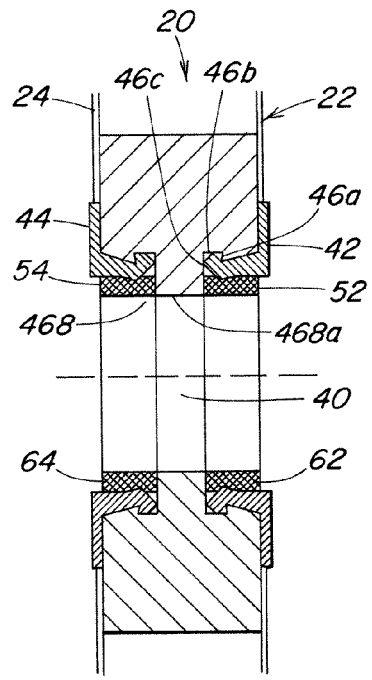
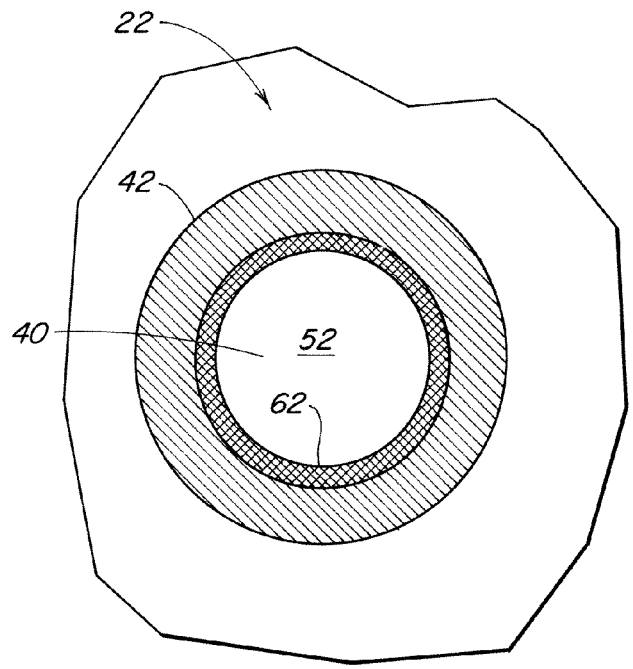
Fig. 4
Fig. 5
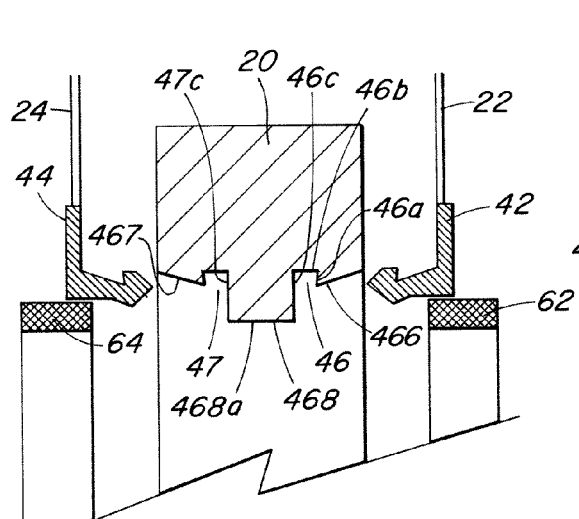
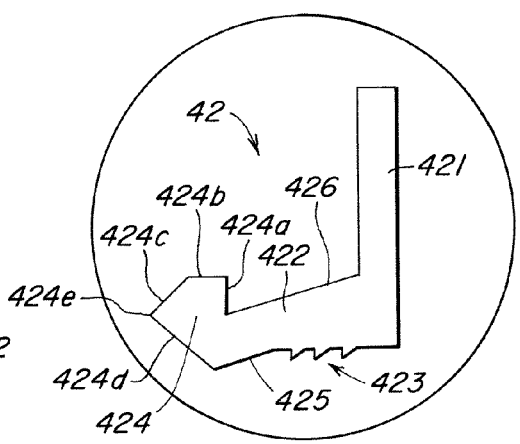
Fig. 6
Fig. 7

FILTER ASSEMBLY

RELATED APPLICATIONS

The present application claims priority as a continuation-in-part to U.S. patent application Ser. No. 11/274,823, entitled "FILTER CLOTH CONNECTOR", filed Nov. 14, 2005, which in turn claims priority to U.S. patent application Ser. No. 10/676,322, entitled "FILTER CLOTH CONNECTION", filed Sep. 30, 2003, which in turn claims priority to U.S. Provisional Patent Application Ser. No. 60/414,718, entitled "Method of Assembling a Filter Plate", filed Sep. 30, 2002, the entire contents of both of which are herein incorporated by reference.

FIELD OF THE INVENTION

The present invention relates to a filter plate in a filter press for separating solids and liquids. More particularly, the present invention relates to a system and method for attaching a filter media to a filter plate.

BACKGROUND OF THE INVENTION

A filter press is an economic and efficient liquid/solid separation device commonly utilized in the clay, chemical, or mining industries. Filter presses generally employ a plurality of filter plates, each filter plate having large areas of a textile material to form a filtering screen. The textile material is typically attached to a cloth, rubber or plastic tubular hub. The tubular hub allows the material to be filtered to pass through successive filtering chambers in the press. The tubular hub must be securely attached to the filtering material to prevent leakage, and is usually constructed of a textile tube or a thermoplastic or rubber material.

In the current state of the art, filter cloth is generally installed on the filter plates by rolling up one side of a duplex filter cloth, which is joined at a feed hole with the tubular hub, and then pushing the rolled up filter cloth through the feed hole of the filter plate. After passing the rolled cloth through the feed hole, the filter cloth is then unrolled. The filter plate thus has a layer of filter cloth on either side thereof, and the two filter cloth layers are fastened together on the filter plate. Slurry is pumped into the filter press and fills each cavity within the stack of filter plates. Solids remain in the chambers and filtrate passes through the cloth, exiting the filter plate.

Conventional methods for joining the filtering material to the tubular hub include sewing the two filter cloth layers together. This approach is labor intensive and thus expensive. Moreover, the sewing tends to create weaknesses in the joint due to the stitch holes. Stitching can also be difficult due to the thickness of the filter cloth and the tubular hub. Other methods include adhesive and bonding agents to secure the filtering cloth to the tubular hub, but these techniques are time consuming since the adhesive must set to form the bond, and is not consistently reliable. Welding requires a split clamping collar positioned between the flanges of the feed neck to transmit force to the weld from a clamping cylinder.

U.S. Pat. No. 4,765,859 describes a method of joining filter cloth to a rubber tubular hub for use as a filter screen, which is installed on a filtering plate in a filtering press. The hub consists of a cylindrical tube that includes two annular flanges protruding radially outward from the circumference of the tube at each end. The tubular hub is fabricated from a rubber material that is collapsible. A filtering screen is then constructed by joining two filter cloths to the hub at each end of the tube. One filter cloth is joined to the hub at the inside surface of one flange, while the other filter cloth is joined to the inside surface of the other flange. The filter cloth and hub are bonded together by induction heating to form a seal to prevent leakage of the filtered material.

U.S. Pat. No. 5,958,173, the contents of which are herein incorporated by reference, describes a method of fabricating a filter screen for a filter press by attaching a filter cloth to a tubular hub using induction heating.

The methods in the prior art of attaching a filter cloth to a filter plate pose a number of disadvantages. The prior methods of installing filter cloths are difficult and time consuming, particularly for larger filters (up to 2 meters by 2 meters square). The large cloth requires a person on each side of the filter plate: one person to push the filter cloth through the hole, and the other person to receive the filter cloth. Large presses are usually re-clothed without removing plates, requiring operators to get between the plates physically, sometimes on platforms above conveyors or high above the ground level, a procedure that can be dangerous. The removal of filter plates in order to replace the filter cloths causes significant losses in productivity, as the filter press cannot be used during the replacement process.

Furthermore, the duplex-type of filter cloths used in the prior art can be expensive, as both layers of a duplex filter cloth must be removed and replaced when a hole forms in only one of the layers. The process of assembling the duplex filter cloths on a flanged tube for attachment to a filter plate is also complex and unwieldy.

It is thus desirable to find a new method for securely joining a filtering material such as a cloth fabric or synthetic material, as commonly used in filtering applications, to a filter plate.

SUMMARY OF THE INVENTION

The present invention addresses the need for an efficient and effective method for attaching a filter cloth to a filter plate installed in a filter press. In an illustrative embodiment of the present invention, a flanged cloth connector ring is fastened about the inner edge of a central feed port in a filter cloth to attach the filter cloth to a filter plate. The connector ring may include a collar portion and a flanged tab portion extending substantially perpendicular to the collar portion. The filter cloth is attached to the connector ring at the collar portion. The flanged tab portion includes a tab clip on an outer surface thereof configured to interface with a slot or bore in the filter plate body, thereby connecting the filter cloth to a first side of the filter plate. A locking ring or a distribution ring may be used to retain the connector ring and lock the tab clip into the filter plate body. Serrations may be provided on an inner surface of the tab portion of the connector ring to hold the lock ring or distribution ring in place by friction fit.

An assembled filter plate may comprise a pair of filter cloths, which are individually attached to each side of the plate using the cloth connector ring and a locking or distribution ring. The cloth connector ring may individually connect each filter cloth, or a tube-shaped cloth connector ring may include flanged tab portions having tab clips on opposite ends of the tube to connect two filter cloths on either side of the filter plate.

The cloth connector ring may include a cloth seat on an outer surface of the collar portion for seating an edge of a filter cloth, such that the filter cloth is substantially flush with a radially inner flange of the collar portion.

The filter cloths in the filter press may suffer damage due to the filling velocity of the liquid in the filter press and the abrasive quality of the slurry. To prevent such abrasion damage, in exemplary embodiments, the filter cloths may have one or more reinforcement units attached to the filter cloths. A reinforcement unit is a piece of a reinforcement material, e.g. a type of plastic, attached to a part of a filter cloth to protect that part of the filter cloth from abrasion. In an exemplary embodiment, a donut-shaped reinforcement unit is attached symmetrically around the feed hole of the filter cloth. When the filter cloth is assembled between a filter plate and a distribution ring, an inner radial portion of the reinforcement unit lies underneath the distribution ring and an outer radial portion of the reinforcement unit extends beyond the distribution ring. That is, the distribution ring seats on top of the reinforcement unit attached to the filter cloth such that the reinforcement unit extends beyond the face of the distribution ring.

According to one aspect, the invention features a filter cloth assembly having a liquid permeable filtering media attached to a connector ring. The liquid permeable filtering media separates at least one solid from at least one liquid in a slurry. The filtering media has a feed hole formed therein that allows passage of a slurry through the filter cloth. The connector ring includes a flange having an upper flange section and a lower flange section. The lower flange section receives an edge of the feed hole to connect the filtering media to the connector ring such that the face of the filtering media is substantially flush with the upper flange section.

In another aspect, the invention features a connector for attaching a filter cloth to a filter plate in a filter press. The connector ring includes a collar portion and a tab portion. The collar portion has an upper collar section and a lower collar section. The lower collar section couples to the perimeter of a central opening of the filter cloth and seats a face of the filter cloth substantially flush with the upper collar section. The tab portion extends at an angle relative to the collar portion configured to engage a recess in the filter plate.

In yet another aspect, the invention features a method of assembling a filter cloth. The method includes providing a connector ring having a flange that includes an upper flange section and a lower flange section and positioning a bonding agent mixed with a metal powder in the lower flange section. The lower flange section receives an edge of a liquid permeable filtering media. The method also includes locating an edge of the filtering media in the lower flange section and heating by induction the metal powder to bond and fixedly retain the filtering media in the lower flange section such that the filtering media is substantially flush with the upper flange section In still another aspect, the invention features a method of assembling a filter plate. The method includes attaching a first filter cloth comprising a filter media and a central opening to a connector ring and engaging the tab portion of the connector ring with a recess in the filter plate. The connector ring includes a collar portion and a tab portion extending perpendicular to the collar portion. The collar portion has an upper collar portion and a lower collar portion. The lower collar portion attaches to the first filter cloth such that the first filet cloth is substantially flush with the upper collar portion of the connector ring. The filter plate includes a feed port for providing a slurry to be filtered.

BRIEF DESCRIPTION OF THE DRAWINGS

The foregoing and other objects, features and advantages of the invention will be apparent from the following description and from the accompanying drawings, in which like reference characters refer to the same parts throughout the different views. The drawings illustrate principles of the invention and, although not to scale, show relative dimensions.

FIG. 4 is a cross-sectional view of a central portion of an assembled filter plate according to an illustrative embodiment of the invention.

FIG. 5 is a top view of the portion of the filter plate shown in FIG. 4.

FIG. 6 is an exploded cross-sectional view of the portion of the filter plate of FIG. 4.

FIG. 7 is a detailed cross-sectional view of the cloth seal connector ring of FIG. 4.

DETAILED DESCRIPTION OF ILLUSTRATIVE EMBODIMENTS

In the illustrative embodiments, the present invention provides an improved system and method for attaching one or more filter cloths to a filter plate in a filter press. The illustrative system includes a cloth connector ring, which connects a filter cloth with a filter plate. The cloth connector ring facilitates assembly of a filter plate, is designed for manufacturability, is low in cost and provides improved efficiency and productivity of a filter press implementing the cloth connector ring to attach a filter cloth to a filter plate. The present invention will be described below relative to illustrative embodiments. Those skilled in the art will appreciate that the present invention may be implemented in a number of different applications and embodiments and is not specifically limited in its application to the particular embodiments depicted herein.

Figure 1:
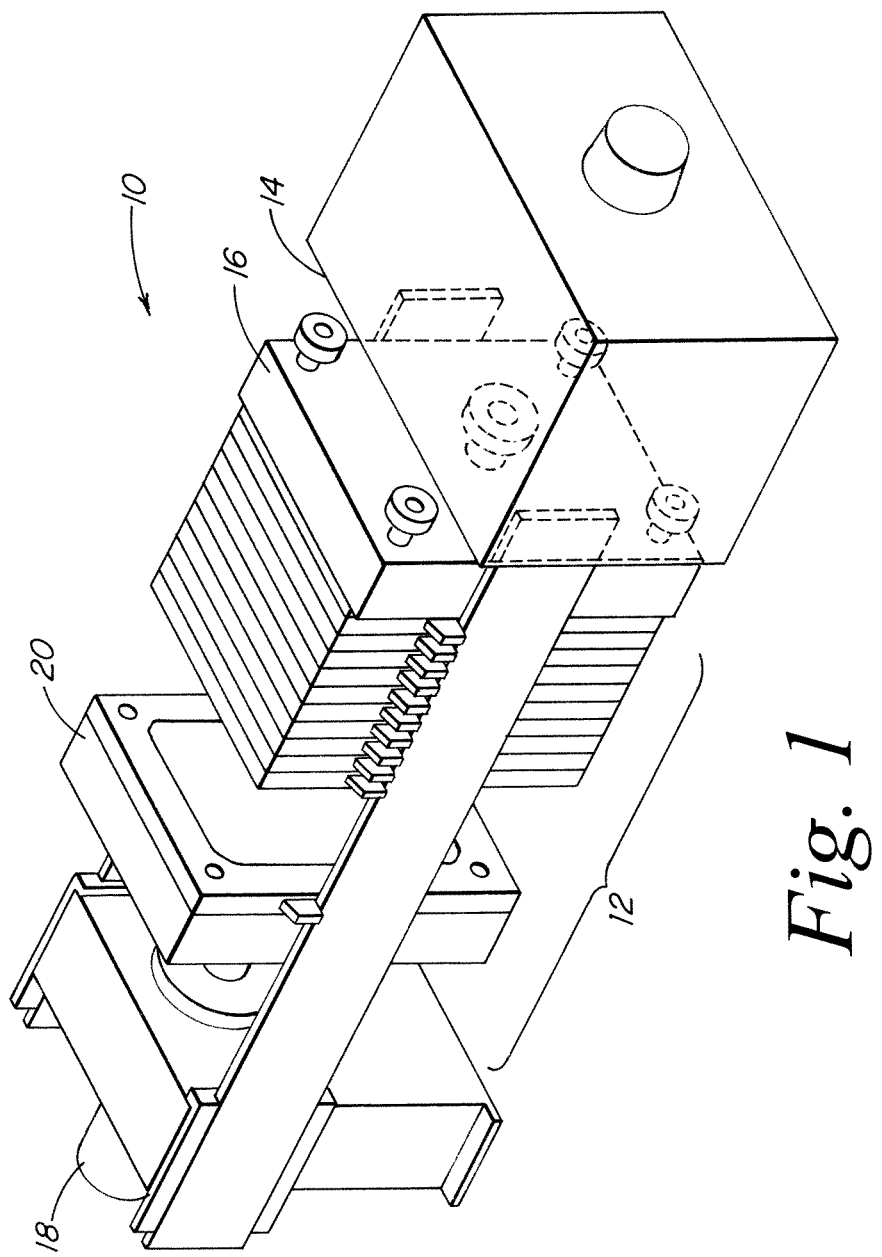
FIG. 1 illustrates a filter press suitable for implementing an illustrative embodiment of the invention.

FIG. 1 illustrates a filter press 10 suitable for implementing an illustrative embodiment of the invention. The illustrative filter press 10 is a batch filtering machine comprising a plurality of filter plates 20 clamped together and sealed against each other on the wedge sides to form a filter plate stack 12. The filter plates form filter chambers 23 between each other. The filter plates support and are covered by filter cloths to form multiple cavities between the plates for collecting solids. The filter press 10 includes a feed head 18 at a first end of the machine containing piping for delivering a slurry to be filtered. As used herein, "slurry" refers to a mixture of liquid and solids that is introduced to a filter press for separation. At a second end of the filter press 10 is a crosshead 14 containing a clamping mechanism. A moving plate 16, known in the art as a "tail plate", clamps the filter plate pack. During a filtering operation, slurry is pumped into filter chambers formed by the stacked filter plates and filter cloths, and is pushed against a filter cloth on a proximate filter plate. Liquid (filtrate) from the slurry passes through the filter cloth and exits through filtrate ports in a filter plate. Solids from the slurry collect on the surface of the filter cloth within the chamber until the chamber is full, which forms a filter cake. The filter cake may be washed or blown dry, if necessary. The collected filter cakes are discharged, completing the filtration cycle.

Figure 2:
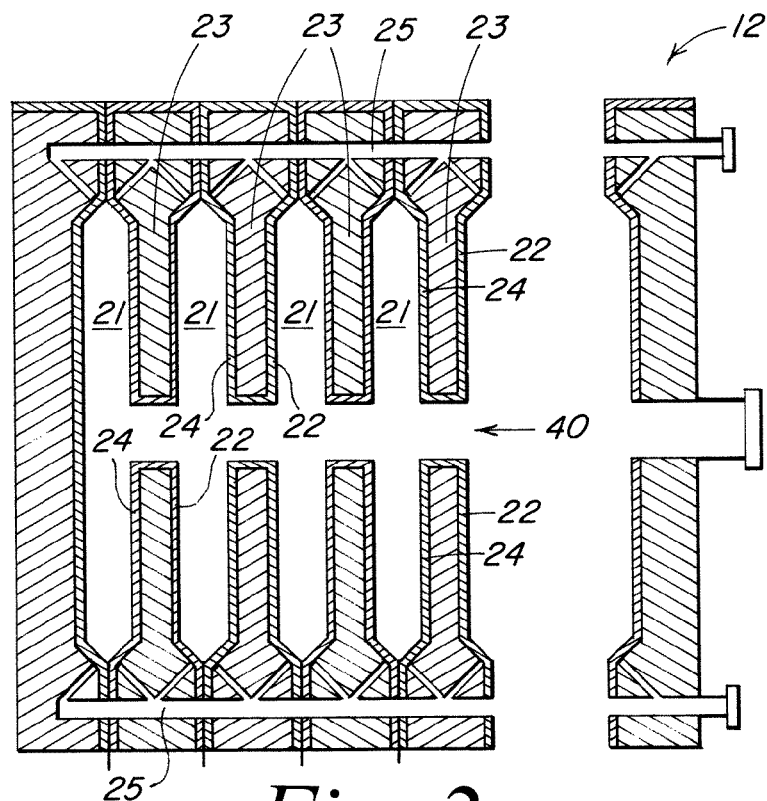
FIG. 2 is a cross-sectional view of a filter plate stack of the filter press of FIG. 1.
Figure 3:
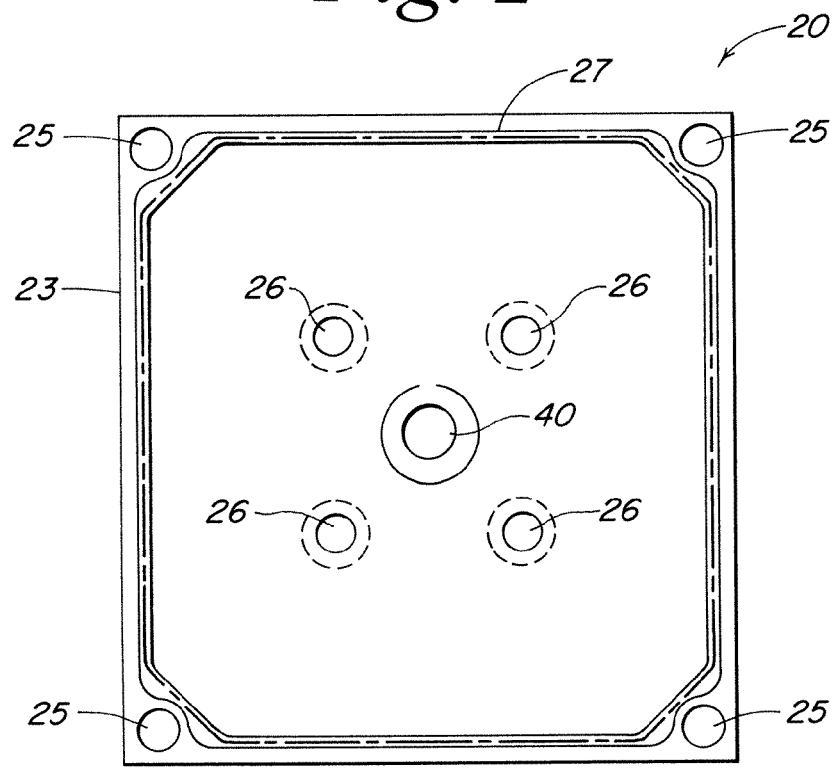
FIG. 3 shows a filter plate in the filter press of FIG. 1, in accordance with an illustrative embodiment of the present invention.

FIG. 2 is a cross-sectional view of a filter plate stack 12 of the filter press of FIG. 1, which comprises a plurality of filter plates 20 stacked together. An embodiment of an individual filter plate 20 is shown in FIG. 3. As shown, each filter plate 20 may comprise a frame 23 with a first layer or sheet of filtering cloth 22 and a second layer or sheet of filtering cloth 24 sealably joined to opposite sides of the frame 23. The filtering cloths 22, 24 form cavities or chambers 21 between the filter plates 20 for retaining solids between the filtering cloths 22, 24 when two or more filter plates 20 are stacked together. A slurry feed port 40 is formed in the center of the filter plate 20 for delivering a slurry to be filtered. Filtrate ports 25 may be provided at the edges of the frame 23 for receiving and transferring filtrate from the filter plate 20. In the illustrative embodiment, stay busses 26, or other suitable stabilization devices, may be provided around the central feed port 40 to help stabilize the filtrate plate 20. One skilled in the art will recognize that the invention is not limited to the illustrated filter plate stack or filter plate configuration, and that the filter plate stack and filter plate may have any suitable configuration for filtering a slurry.

The filter cloths 22 and 24 may be fabricated from a natural or man-made material or any combination thereof, which is acceptable for filtering applications. Suitable fabrics for forming the filter cloths 22, 24 include, but are not limited to natural fibers, such as cotton, or plastic fibers, such as polypropylene or nylon, for retaining cake solids. One skilled in the art will recognize that any suitable material for filtering a slurry may be used.

During a filtering process, a filter cloth 22 or 24 covers each side of the filter plate 20. As the slurry is pumped into the plate stack 12, the filter cloths retain the solids and allow the filtrate to pass through, completing the separation process. The filter cloths 22, 24 are fastened together and attached at an outside edge 27 formed in the perimeter of the plate 20. Any suitable means known in the art may be used to form the peripheral seal, including, but not limited to Velcro, ties, o-rings, a rope hammered into a groove extending along the perimeter, and so on. The filter cloths 22, 24 are sealingly connected to each side of the filter plate 20 at the feed position 40, which receives a pumped slurry under pressure to fill the filter chamber 21.

According to an illustrative embodiment of the invention, each filter cloths 22 or 24 is connected to a side of a filter plate using a cloth connector ring. According to the illustrative embodiment, the filter plate includes a surface having a recess or other feature configured to receive and retain a cloth connector ring for attaching a filter cloth to the filter plate. For example, as described with respect to FIGS. 4-11, a flanged connector ring 42, 44, 92, 94, 212 or 214 may be used to sealingly connect a filter cloth to a filter plate at a feed position 40 of the filter plate. According to the illustrative embodiment, the feed position 40 is located in the center of the plate. One skilled in the art will recognize that the feed position, and thus the attachment point of the filter cloths 22, 24 may alternatively be located in a corner or location offset from the center of the filter plate 20.

FIG. 4 is a cross-sectional side view of an assembled filter plate 20 at the point of attachment of the filter cloths 22, 24 according to an illustrative embodiment of the invention. FIG. 5 is a detailed top view of the region of the filter plate 20 where a filter cloth 22 is attached to the filter plate. FIG. 6 is an exploded cross-sectional view of the components of the filter plate shown in FIG. 4. In the illustrative embodiment, each filter cloth 22, 24 includes a feed hole 52, 54, respectively, corresponding to the slurry feed port 40 of the filter plate. In the illustrative embodiment, a feed hole is located in the central portion of the filter cloth, though one skilled in the art will recognize that the feed hole and feed ports may be located in any suitable position. A first cloth connector ring 42 is connected to the first filter cloth 22 around the perimeter of the feed hole 52 for attaching to first filter cloth 22 to a first side of the filter plate 20. A second cloth connector ring 44 is connected to the second filter cloth 24 around the perimeter of the feed hole 54 for attaching the second filter cloth 24 to a second side of the filter plate 20. According to the illustrative embodiment, the cloth connector rings 42, 44 may be connected to the corresponding filter cloth by sewing, welding or mechanically coupling an inner edge of the filter cloth, defined by the central hole 52 or 54, to the corresponding connector ring 42 or 44 through means known in the art. One skilled in the art will recognize that any suitable means for connecting a connector ring to a filter cloth may be used in accordance with the teachings of the invention.

The cloth connector ring may have any suitable configuration. For example, the cloth connector ring may have a circular cross-section, a polygonal cross-section or have any suitable shape, preferably matching the shape of the feed hole 52 of the filter cloth to which the cloth connector ring is attached.

According to an illustrative embodiment, as shown in FIGS. 4-7, the slurry feed port 40 of the filter plate 20 is configured to receive and retain a cloth connector ring 42 or 44. As shown, a filter cloth 22 or 24 may be attached to a side of the filter plate 20 by inserting an associated cloth connector ring 42 or 44 in the feed port 40, such that the inner surface of the feed port 40 receives and retains the cloth connector ring, thereby attaching a filter cloth associated with the cloth connector ring to the filter plate. According to the illustrative embodiment, the cloth connector rings are configured to be received and retained by the inner surface of the central slurry feed port. For example, the cloth connector rings may have an outer surface that is complementary to the inner surface of the central slurry feed port. One skilled in the art will recognize that the filter plate 20 and the cloth connector rings may have any suitable configuration for coupling the cloth connector ring to the filter plate, and that the invention is not limited to the illustrated configuration.

In the embodiment shown in FIGS. 4 and 6, the slurry feed port 40 of the illustrative filter plate 20 includes recesses or grooves, illustrated as first and second undercut counter bores 46, 47 or slots cut into the filter plate on the inner surface of the port 40. In the illustrative embodiment, the bores 46, 47 extend in a radial direction, perpendicular to the longitudinal axis -A- of the filter plate 20. Each of the bores 46, 47 defines a shoulder and a radial groove formed in the counter bore adjacent to the shoulder. The first undercut counter bore 46 receives the first cloth connector ring 42 attached to the first filter cloth 22 and the second undercut counter bore 47 receives the second cloth connector ring 44 attached to the second filter cloth 24. The inner surface of the central feed port 40 also includes a first inclined surface 466 extending from the first side of the filter plate inward to the first bore 46 at an incline relative to the longitudinal axis -A- and a second inclined surface 467 extending from the second side of the filter plate 20 inward toward the second bore 47. One skilled in the art will recognize that the surfaces 466 and 467 may alternatively extend parallel to the axis -A-. An annular central protrusion 468 extends around the inner surface of the feed port 40 between the bores 46, 47. The annular central protrusion 468 is defined by walls 46c and 47c of the bores 46 and 47, respectively, and an axially extending surface 468a having a reduced diameter relative to the bores 46 and 47 and the surfaces 466 and 467.

Locking rings 62, 64 may also be provided for locking the cloth seal ring connector rings 42, 44, respectively in place after insertion, thereby locking the filter cloths 22, 24 to the filter plate 20.

FIG. 7 illustrates an embodiment of a cloth connector ring 42 in detail, though one skilled in the art will recognize that the cloth connector ring 42 may have any suitable configuration for coupling to the filter plate 20 to attach a filter cloth to thereto. As shown in FIG. 7, the illustrative cloth connector ring has a configuration that is complementary in shape to the feed port inner surface, comprised of surfaces 466, 467, 468a and bores 46 and 47. As shown, the cloth connector ring 42 comprise a flat, preferably annular, collar portion 421 attaching the cloth connector ring to a filter cloth. The collar portion 421 is configured to abut a first side of the filter plate in the vicinity of the feed port 40, as shown in FIG. 4.

The cloth connector ring 42 further includes a flanged tab clip portion 422 extending inward and substantially perpendicular to the collar portion 421. The flanged tab portion 422 is configured to abut the inner surface of the central feed port 40 to secure the cloth seal connector ring 42, and thus a connected filter cloth, to the filter plate. The tab portion 421 terminates in an axially outward extending tab clip 424, which is received by the bore 46 of the filter plate to secure the connector ring 42 to the filter plate. The illustrative tab clip flange 424 includes a first surface 424a configured to abut a axially extending wall 46a of the bore and a second surface 424b configured to abut a longitudinally extending wall 46b of the bore. A third wall 424c and a fourth wall 424d of the flange 424 extend at inclines relative to the longitudinal axis and converge at an end, illustrated as a point 424e forming the end of the connector ring 42. The point 424e abuts a second axially extending wall 46c, which terminates in the protrusion 468. Alternatively, the third wall 424c and fourth wall 424d may form a flat end configured to abut, and lie flat against, the central protrusion 468. One skilled in the art will recognize that the tab portion 422 may have any suitable configuration for cooperating with a surface of the filter plate to attach the connector ring to the filter plate.

The illustrative tab portion 422 may further include serrations 423 on an inner face 425 of the tab portion 422, opposite the surfaces that interact with the feed port inner surface. The serrations 423 enhance the friction fit between the connector ring and a corresponding locking ring 62 or a distribution ring (described below). As shown, the tab portion outer surface 426 matches the inclined surface 466 of the slurry feed port 40 of the filter plate and is configured to abut against the inclined surface 466. As shown, the tab portion outer surface 426 is inclined relative to the longitudinal axis at a similar angle to the angle of the inclined surface 466. The tab portion outer surface 426 abuts the inclined surface 466 of the slurry feed port 40 when the filter plate is assembled to securely and sealingly connect the filter cloth 22 to the filter plate 20. One skilled in the art will recognize that the tab portion outer surface 426 and the inner surface 466 of the slurry feed port may have any suitable configuration. According to a preferred embodiment, the tab portion outer surface 426 and the inner surface 466 of the slurry feed port have complementary shapes to facilitate attachment of the cloth connector ring to the filter plate.

According to the illustrative embodiment, the second cloth connector ring 44 of FIGS. 4-6 is configured similar to the first cloth connector ring 42, though one skilled in the art will recognize that the cloth connector rings 42 and 44 may have different configurations. One skilled in the art will recognize that the tab portions and cloth connector rings are not limited to the illustrative configuration and that any suitable configuration for sealingly connecting the filter cloth to the filter plate may be used in accordance with the invention.

The cloth connector ring 42, 44 may be manufactured from rubber, thermoplastic rubber, plastic, cloth, nylon, polypropylene, polyester or any other suitable material and may be formed by machining, molding or any other suitable process.

To assemble the filter plate 20 of FIGS. 4-6 using a cloth connector ring having a configuration shown in FIG. 7, a first filter cloth 22 is connected to a first cloth connector ring 42 and aligned with the filter plate, such that the feed port 52 of the filter cloth 22 aligns with the feed port 40 of the filter plate 20. The tab portion 422 of the connector ring is pushed into the feed port 40, such that the flange 424 engages the bore 46 and the inclined outer surface 426 abuts the inclined inner surface 466 of the filter plate. Next, the locking ring 62 is pushed into position in the central feed port 40 to lock the tab clip flange 424 into the bore 46 on the filter plate body. The locking ring is pushed until the end of the locking ring abuts the protrusion 468 and the outer surface of the locking ring abuts the inner surface of the tab portion. The locking ring 62 is stopped by the protrusion ring 468 and held in place by friction fit with the serrations 423 and the protrusion ring 468. The outer edges of the filter cloth are then attached to the outer edges of the filter plate frame through means known in the art, as described above. The second filter cloth 24 is attached to the second side of the filter plate 20 in a similar manner, using the second cloth connector ring 44 and second locking ring 64.

Figure 10:
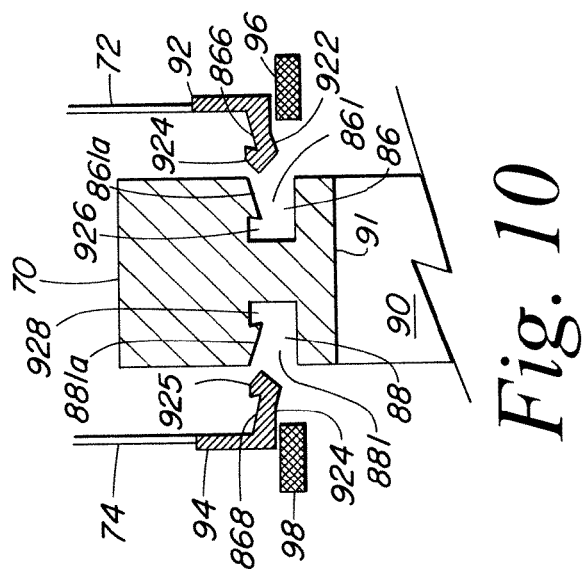
FIG. 10 is an exploded cross-sectional view of the portion of the filter plate of FIG. 8.
Figure 9:
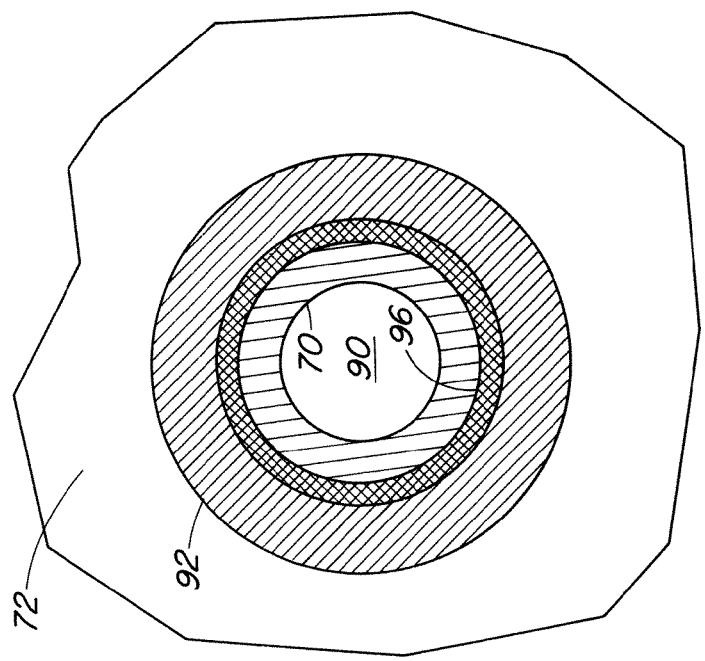
FIG. 9 is a top view of the portion of the filter plate shown in FIG. 8.
Figure 8:
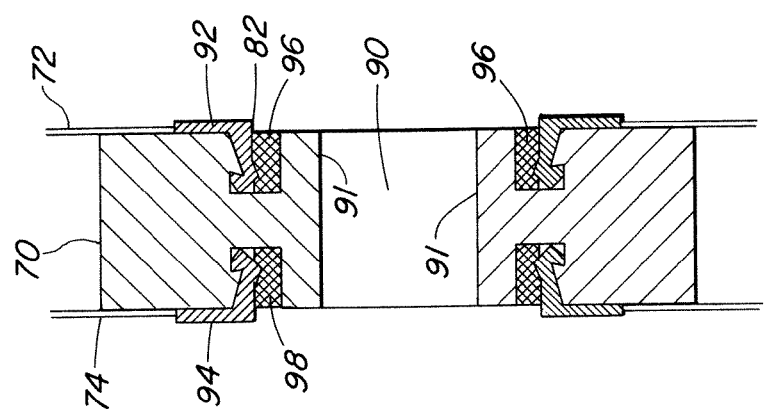
FIG. 8 is a cross-sectional view of a central portion of an assembled filter plate according to another embodiment of the invention.

According to another embodiment of the invention, the recesses receiving the connector rings for attaching a filter cloth to a filter plate comprise slots. For example, as shown in FIGS. 8-10, a filter plate 70 includes a first slot 86 for attaching a first filter cloth 72 to a first side of the filter plate 70 using a first cloth connector ring 92 and a second slot 88 for attaching a second filter cloth 72 to a second side of the filter plate 70 using a second cloth connector ring 94. As shown, in the second embodiment, the central feed port 90 has a straight inner surface 91. The first slot 86, which preferably comprises an annular undercut groove, is spaced axially outwardly from and surrounding the central feed port 90 and is cut into the first side of the filter plate for receiving the first connector ring 92 and first lock ring 96 in order to fasten the first filter cloth 72 to the filter plate 70. A second slot 88, preferably an annular undercut groove aligned with the first circular undercut slot and spaced axially outwardly from and surrounding the central feed port 90, is cut into the second side of the filter plate for receiving the second connector ring 94 and second lock ring 98 in order to fasten the second filter cloth 74 to the filter plate 70.

According to the illustrative embodiment, the filter cloths 72, 74 and connector rings 92, 94 of FIGS. 8-10 are substantially identical to the filter cloths 22, 24 and connector rings 42, 44 of FIGS. 4-7. However, in the embodiment of FIGS. 8-10, the diameters of the feed holes 82, 84 of the filter cloths and connector rings is larger than the diameter of the central feed port 90, rather than the same as the diameter of the central feed hole, as shown in the embodiment of FIGS. 4-7. In the embodiment of FIGS. 8-10, the diameter of the connector rings and filter cloths are configured to allow insertion of the tab portions 922, 942 of the connector rings 92, 94 in the slots 86, 88 of the filter plate.

As shown, each slot 86, 88 is spaced from the feed port 90 and includes a main portion 861, 881, respectively, extending substantially parallel to the longitudinal axis. The main portions 861, 881 have an inclined wall 861a, 881a, respectively, configured to abut the inclined wall 866, 868 of the corresponding tab portion 922, 942, respectively and a longitudinally extending wall 861b, 881b. Each slot further includes a radially extending recess 926, 928, respectively for receiving the flange 924, 925 of the tab portion on the connector ring.

To assemble the filter plate 70 of FIGS. 8-10, the first filter cloth 72 is connected to the associated cloth connector ring 92 and aligned with the filter plate such that the feed port of the filter cloth aligns with the feed port of the filter plate. The tab portion 922 of the connector ring is pushed into the circular slot 86, such that the flange 924 engages the radially extending recess 926 and the inclined inner surface 866 abuts the inclined inner surface 861a of the filter plate. Next, the locking ring 62 is inserted into the slot 86 between the tab portion 922 and the longitudinally extending wall 861b and pushed into position to lock the tab clip flange 924 into the bore 46 on the filter plate body. The locking ring 96 is pushed until the end of the locking ring abuts the radially extending wall of the recess 926. The serrations on the surface of the connector ring hold the locking ring in place by friction fit. The second filter cloth 74 is attached to the second side of the filter plate 70 in a similar manner, using the second cloth connector ring 94 and second locking ring 98.

Figure 11:
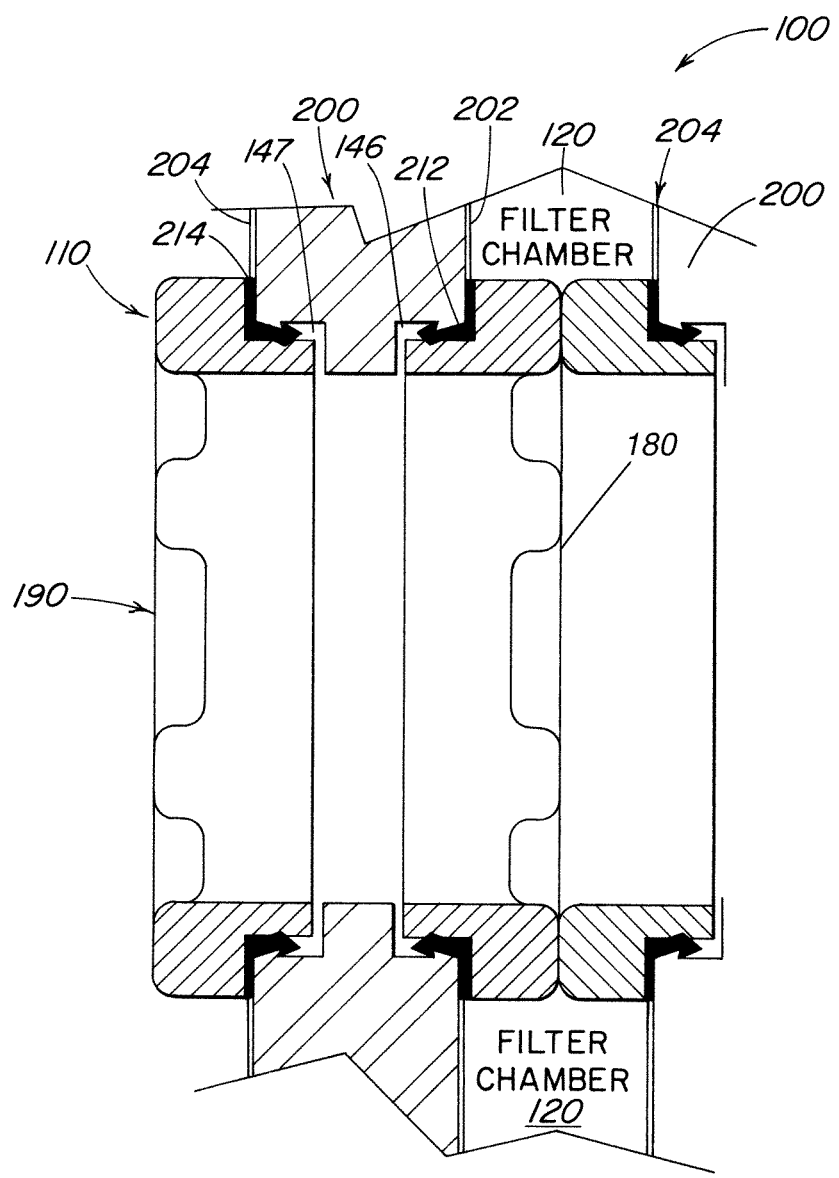
FIG. 11 is a cross-sectional view of a central portion of an assembled filter plate stack according to another embodiment of the invention, including a plurality of distribution rings.

According to yet another embodiment of the invention, shown in FIG. 11, a filter plate pack 100 includes one or more distribution rings 110 in place of the lock ring to secure the cloth connector rings and filter cloths to the filter plate frame. Distribution rings are known in the art and are used in filter presses to support the filter plate at the feed port to prevent overflexing the plate during the feed cycle, caused by pressure differentials. The distribution rings 110 ensure that the plates are stacked evenly to enhance the filtering process. Each distribution ring contacts a distribution ring on an adjoining plate to form a continuous support along the length of a filter plate pack. Slurry enters a filter chamber 120 between the filter plates via peripheral slots formed or machined into the circumference of the distribution rings faces. Slurry also enters a filter chamber 120 through one or more channels 180 formed within the distribution rings 110.

As shown in FIG. 11, each filter plate 200 has a pair of filter cloths 202, 204 attached to either side of the filter plate via connector rings 212, 214. The connector rings are attached to the filter cloths at the central opening of each feed cloth, though one skilled in the art will recognize that the connector rings may be attached to any suitable location on the filter plate using any suitable connection means. In the illustrative embodiment, the connector rings 212, 214 engage counter bores 146, 147 in the inner surface of the central feed port 190 of the filter plate, as described above with respect to the embodiments shown in FIGS. 4-7, though one skilled in the art will recognize that the invention is not limited to the illustrated embodiment. A distribution ring 110 is pushed into position and held by a press fit between a connector ring and an adjacent distribution ring. A distribution ring 100 is also held by friction of the tab serrations on the tab portion of the connector rings 212, 214. By the action of clamping the filter press, the distribution rings 110 are correctly seated without contacting the bottom of the counter bores 146, 147 of the filter plate. When the filter is clamped, a positive seal is created between the distribution ring and the cloth connector ring.

The filter cloths 202, 204 in the filter press may suffer damage due to the filling velocity of the liquid in the filter press and the abrasive quality of the slurry. To protect the filter cloths from abrasion damage, exemplary embodiments provide one or more reinforcement units attached to the filter cloths 202, 204. A reinforcement unit is a piece of a reinforcement material, e.g. a type of plastic, attached to a part of a filter cloth to protect that part of the filter cloth from abrasion.

Figure 18A:
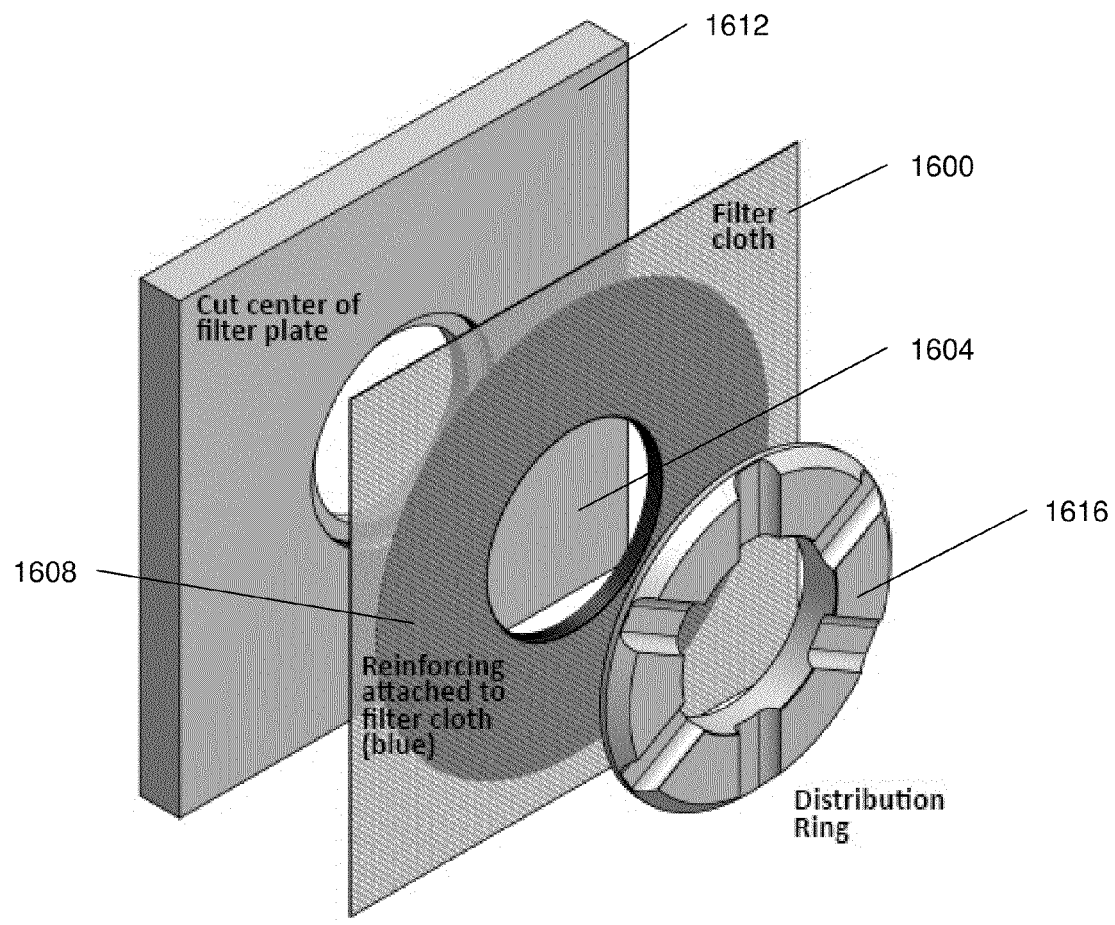
FIG. 18A is a perspective view of a portion of an exemplary filter plate, a portion of an exemplary reinforced filter cloth, and a distribution ring.
Figure 18B:
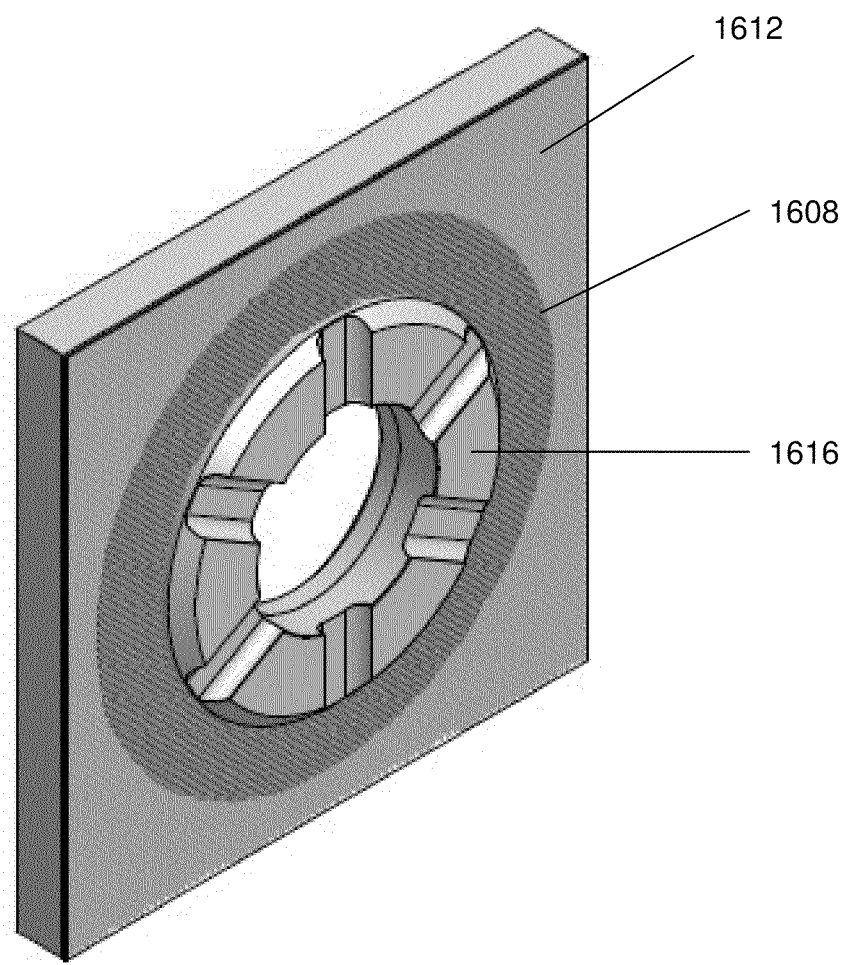
FIG. 18B is a perspective view of the filter plate, filter cloth, and distribution ring shown in FIG. 18A assembled together.

FIG. 18A is a perspective view of a portion of an exemplary filter plate 1612, a portion of an exemplary reinforced filter cloth 1600, and a distribution ring 1616. In the exemplary embodiment shown in FIG. 18A, a donut-shaped reinforcement unit 1608 is attached to the filter cloth 1600 symmetrically around the feed hole 1604 of the filter cloth 1600. FIG. 18B is a perspective view of the filter plate 1612, filter cloth 1600, and distribution ring 1616 shown in FIG. 18A assembled together. As shown in FIG. 18B, when the filter cloth 1600 is assembled between a filter plate 1612 and a distribution ring 1616, an inner radial portion of the reinforcement unit 1608 lies underneath the distribution ring 1616, and an outer radial portion of the reinforcement unit 1608 extends beyond the distribution ring 1616. That is, the distribution ring 1616 seats on top of the reinforcement unit 1608 attached to the filter cloth 1600, such that the reinforcement unit 1608 extends beyond the face of the distribution ring 1616.

The filter plate 200 of FIG. 11 is substantially identical to filter plate of FIGS. 4-7, however, the counter bores 146, 147 of the plate 200 may be wider than the bores 46, 47 of the plate 20 to prevent the distribution rings 110 from contacting the wall of the protrusion 1468 in filter plate 200.

In addition to facilitating installation of the filter cloths 202, 204 on a filter plate 200, the embodiment of FIG. 11 facilitates installation of the distribution rings 110 in the filter stack 100. Prior distribution rings are generally awkward to install and are required to be screwed together. The present invention allows manual installing without difficulty. The distribution rings can be inserted into the feed ports by hand and are held in place by friction fit.

Figure 12:
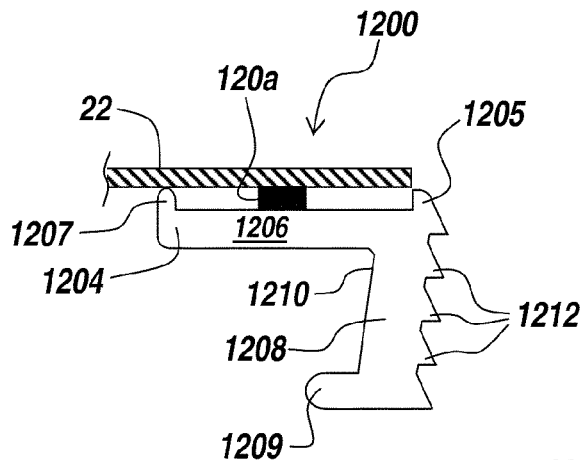
FIG. 12 is a detailed cross-sectional view of an embodiment of a cloth seal connector ring constructed according to principles of the invention.
Figure 13:
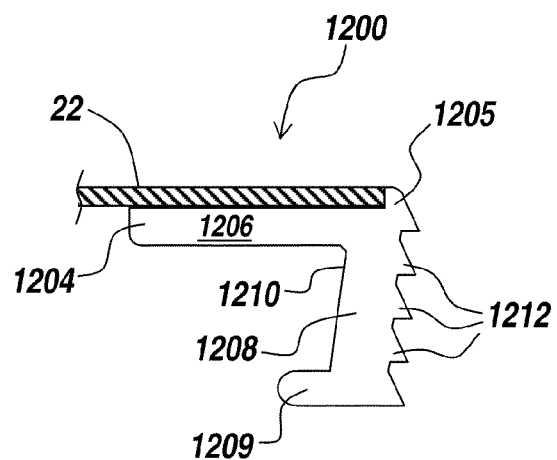
FIG. 13 is a detailed cross-sectional view of the cloth seal connector ring after attachment of the filter cloth.
Figure 14:
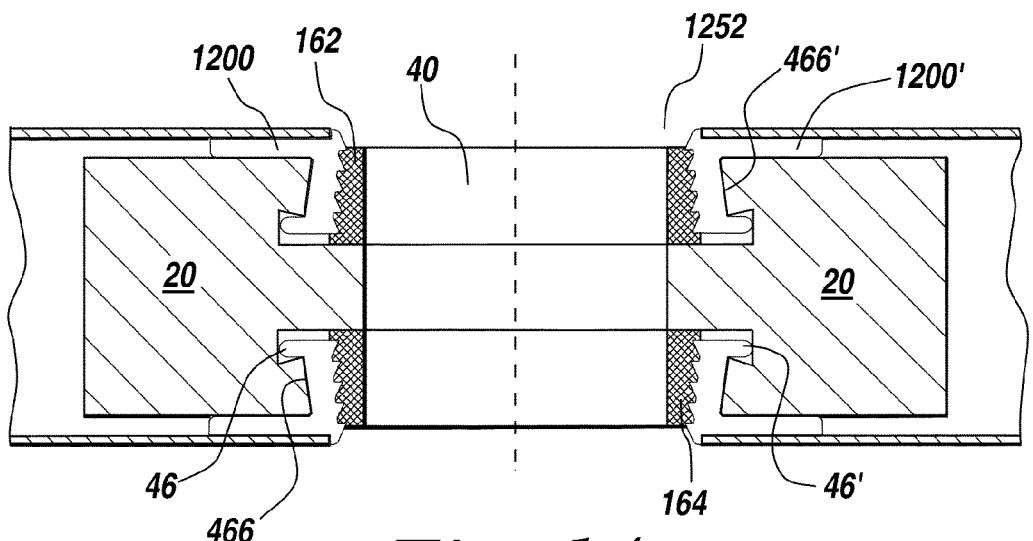
FIG. 14 is a cross-sectional view of a central portion of an assembled filter plate according to an illustrative embodiment of the invention.

FIGS. 12-14 depict another embodiment of a cloth connector ring suitable for connecting a filter cloth to a filter plate according to the teachings of the invention. FIG. 12 illustrates another embodiment of a cloth connector ring 1200 in detail prior to connecting a filter cloth 22 to the connector ring 1200. FIG. 13 depicts an embodiment of a cloth connector ring 1200 in detail after connecting the filter cloth 22 to the connector ring 1200. FIG. 14 is a cross-sectional side view of an assembled filter plate 20 at the point of attachment of the filter cloths 22, 24 according to an illustrative embodiment of the invention.

As shown in FIG. 12, the illustrative cloth connector ring has a configuration that is complementary in shape to the feed port inner surface of the filter plate 20. As shown, the cloth connector ring 1200 comprise a flat, preferably annular, collar portion 1204 attaching the cloth connector ring to a filter cloth. The collar portion 1204 is configured to abut a first side of the filter plate in the vicinity of the feed port 40, as shown in FIG. 14. The collar portion 1204 forms a filter cloth seat on an outer surface for receiving an edge of a filter cloth, and includes an upper collar section 1205, a lower collar section 1206, and an end nub 1207. The upper collar section 1205 is preferably formed at a radially inner section of the cloth connector ring 1200 around central opening 1252 functions as a stop or catch for the filter cloth 22 when the filter cloth 22 is attached to the connector ring 1200.

The lower collar section 1206 is configured to receive a bonding agent 120a and the filter cloth 22 to attach the filter cloth 22 to the connector ring 1200. The lower collar section 1206 functions as a filter cloth seat such the filter cloth 22 is substantially flush with the upper collar section 1205 once attached. Seating the filter cloth 22 substantially flush with the upper collar section 1205 is advantageous, because during scraping of the filter cloth 22, the scraper is less likely to cause a separation of the filter cloth 22 and the connector ring 1200.

The end nub 1207 protrudes from an end of the collar portion 1204. The end nub can protrude substantially perpendicular from the end of the collar portion 1204. It should be understood that the end nub 1207 can extend at other angles as well. The end nub 1207 is constructed of the same material as the collar portion 1204 and mixes with the bonding agent 120a during the attachment process (e.g., heating by radio frequency or other means).

The bonding agent 120a can be shaped as an annular ring, although other shapes are contemplated. An exemplary bonding agent is a thermoplastic bonding agent, such as polypropylene, mixed with a ferrous metal powder. The proportion of metal powder used can be between 1% and 50% by volume of the bonding agent. It should be understood that other bonding agents can be as well.

The cloth connector ring 1200 further includes a flanged tab clip portion 1208 extending inward and substantially perpendicular to the collar portion 1204. The flanged tab portion 1208 is configured to abut the inner surface of the central feed port 40 to secure the cloth seal connector ring 1200, and thus a connected filter cloth, to the filter plate. The tab portion 1208 terminates in an axially outward extending tab clip flange 1209, which is received by the bore 46 of the filter plate to secure the connector ring 1200 to the filter plate. The illustrative tab clip flange 1209 is semicircular in shape. One skilled in the art will recognize that the tab portion 1208 may have any suitable configuration for cooperating with a surface of the filter plate to attach the connector ring to the filter plate. For example, the tab portion can be shaped similar to that shown and described in FIG. 4. The illustrative tab portion 1208 may further include serrations 1212 on an inner face 1216 of the tab portion 1208, opposite the surfaces that interact with the feed port inner surface.

FIG. 13 shows the configuration of the connector ring 1200 after the connection of the filter cloth 22. As shown, the bonding agent 120a and the end nub 1207 are heated to cause the mixing thereof. Examples of heating can include but are not limited to induction heating, forced air heating, radio frequency heating, microwave heating, and the like. As a result, the mixed bonding agent and end nub material attach the filter cloth 22 to the connector ring 1200 such that an outer face of the filter cloth 22 is substantially flush with the upper collar section 1205.

FIG. 14 shows two connector rings connected to the filter plate 20 in a manner similar to that previously described. As shown, a second cloth connector ring 1200' is configured similar to the first cloth connector ring 1200, though one skilled in the art will recognize that the cloth connector rings 1200' and 1200 may have different configurations. One skilled in the art will recognize that the tab portions and cloth connector rings are not limited to the illustrative configuration and that any suitable configuration for sealingly connecting the filter cloth to the filter plate may be used in accordance with the invention. As shown in FIGS. 12-14, the tab portion outer surface 1210 matches the inclined surface 466 of the slurry feed port 40 of the filter plate and is configured to abut against the inclined surface 466. As shown, the tab portion outer surface 1210 is inclined relative to the longitudinal axis at a similar angle to the angle of the inclined surface 466. The tab portion outer surface 1210 abuts the inclined surface 466 of the slurry feed port 40 when the filter plate is assembled to securely and sealingly connect the filter cloth 22 to the filter plate 20. One skilled in the art will recognize that the tab portion outer surface 1210 and the inner surface 466 of the slurry feed port may have any suitable configuration. According to a preferred embodiment, the tab portion outer surface 1210 and the inner surface 466 of the slurry feed port have complementary shapes to facilitate attachment of the cloth connector ring to the filter plate.

Locking rings 162, 164 may also be provided for locking the cloth connector rings 1200, 1200', respectively in place after insertion, thereby locking the filter cloths 22 to the filter plate 20. As shown in FIG. 14, each locking ring may have a radially outer surface that is configured to abut the serrated surface 1212 of the corresponding filter cloth connector ring. The radially outer surface of the locking ring may be serrated, as shown in FIG. 14, or have another suitable configuration.

According to another embodiment of the invention, the two cloth connector rings 1200 and 1200' may be connected to each other to form a unitary structure for connecting a plurality of filter cloths to opposite sides of a filter plate 20.

Figure 15:
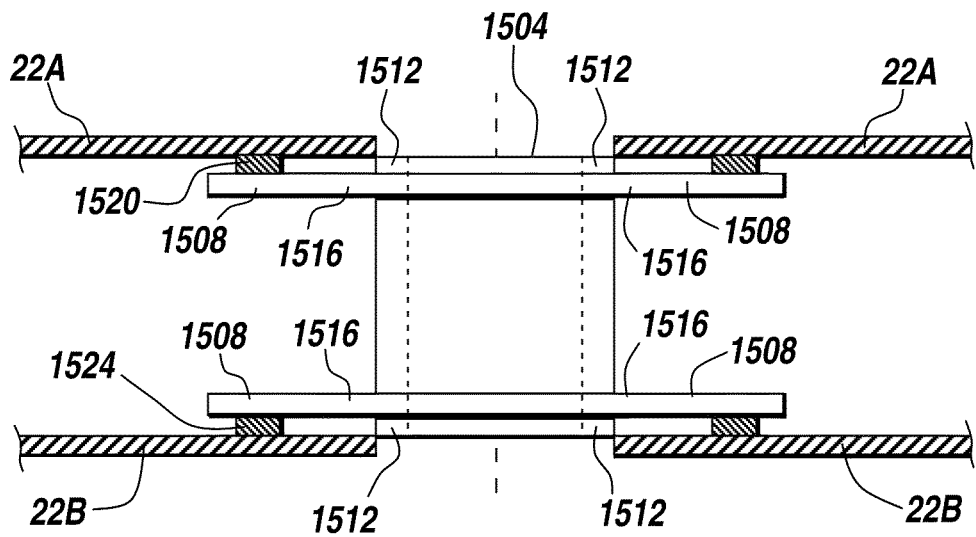
FIG. 15 is a detailed cross-sectional view of an embodiment of a cloth seal connector ring constructed according to principles of the invention.
Figure 16:
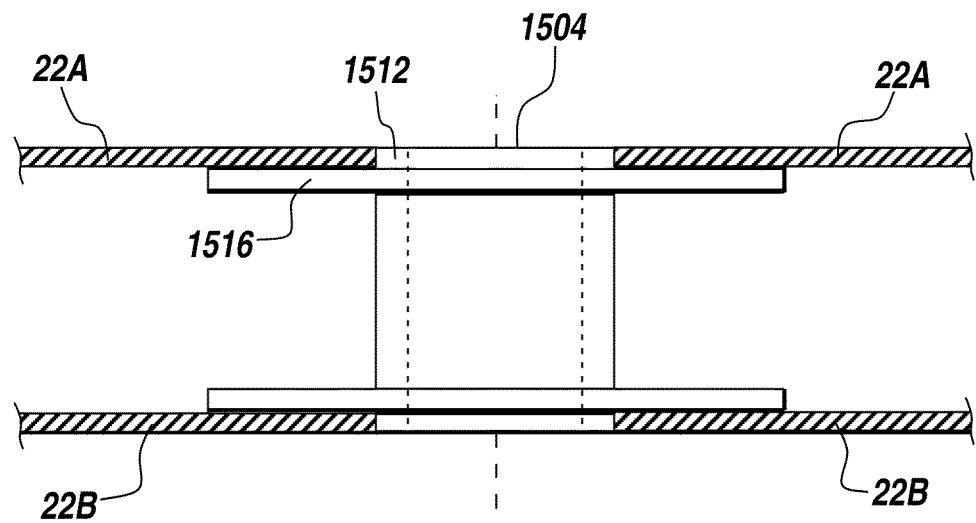
FIG. 16 is a detailed cross-sectional view of the cloth seal connector ring after attachment of the filter cloth.
Figure 17:
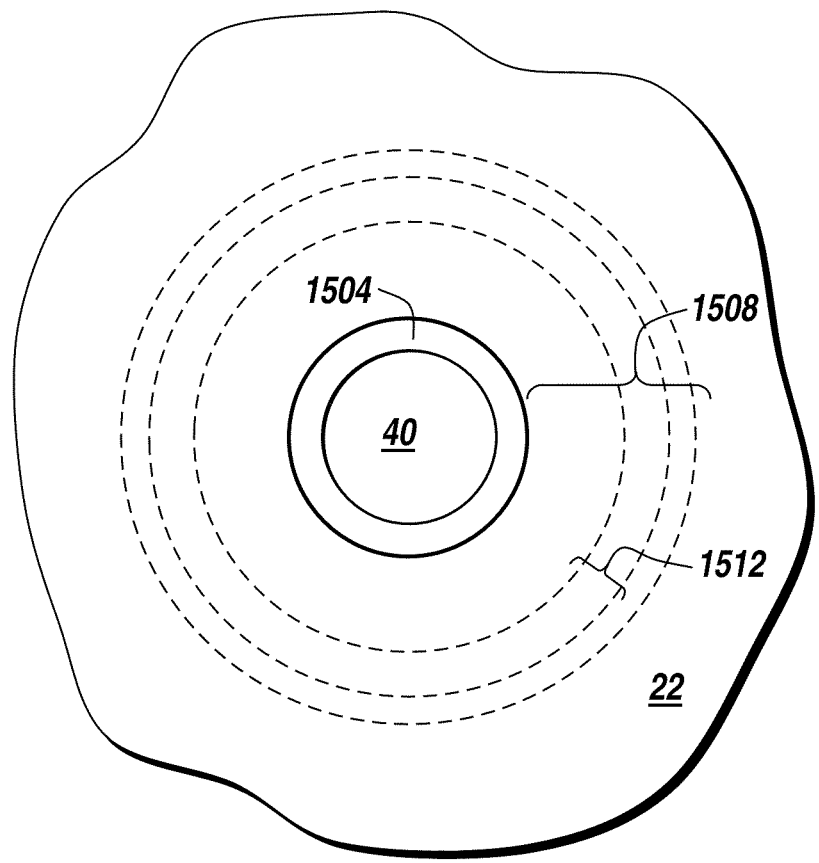
FIG. 17 is a top view of the portion of the filter plate shown in FIGS. 15 and 16.

FIGS. 15-17 show another embodiment of a cloth connector ring suitable for connecting a filter cloth to a filter plate according to the teachings of the invention. FIG. 15 illustrates another embodiment of a cloth connector ring in detail prior to connecting the filter cloth 22 to the connector ring. FIG. 16 depicts an embodiment of a cloth connector ring in detail after connecting the filter cloth 22 to the connector ring. FIG. 17 is a top view of the region of the filter plate 20 where a filter cloth 22 is attached to the filter plate, according to an illustrative embodiment of the invention.

With reference to FIG. 15, the cloth connector ring may comprise a rubber or like component forming a tube 1504 that is attached to two filter cloths 22A, 22B. The tube 1504 has radially extending flanges 1508 at each end of the tube 1504. Each flange 1508 includes an radially inner section 1512 and a radially outer section 1516. The radially inner section 1512 functions as a stop or catch for the feed hole of the filter cloth 22 when the filter cloth 22 is attached to tube 1504.

The radially outer section 1516 is configured to receive a bonding agent 1520 and the filter cloth 22 to attach the filter cloth 22 to the tube 1504. The radially outer section 1516 functions as a "seat" such that the filter cloth 22 is substantially flush with the radially inner section 1512 once attached, as shown in FIG. 16. Seating the filter cloth 22 substantially flush with the radially inner section 1512 is advantageous, because during scraping of the filter cloth 22, the scraper is less likely to cause a separation of the filter cloth 22 and the tube 1504.

An annular piece of bonding agent 1520, 1524 is located between each of the flanges 1508 and the filter cloths 22. The bonding agent 1520, 1524 can also have other shapes. An exemplary bonding agent is a thermoplastic bonding agent mixed with a ferrous metal powder. The proportion of metal powder used can be between 1% and 50% by volume of the bonding agent. It should be understood that other bonding agents can be as well.

FIG. 16 shows the configuration of the tube 1504 after the connection of the filter cloth 22. As shown, the bonding agent 1520, 1524 is heated to cause the filter cloth to be attached to the radially outer section 1516. Example of heating can include but are not limited to induction heating, forced air heating, radio frequency heating, microwave heating, and the like. After heating the filter cloth 22 is attached to the tube 1504 such that an outer face of the filter cloth 22 is substantially flush with the radially inner section 1512.

As shown in the detailed top view of FIG. 17, the filter cloth 22 abuts the radially inner section 1512. Also, the outer face of the filter cloth 22 rests substantially flush with the radially inner section 1512.

According to an alternate embodiment, the tube 1504 forming the cloth connector ring with radially inner section and the radially outer section 1512 and 1516, respectively, may comprise two separate components, each having an radially inner section 1512 and radially outer section 1516 to form a filter cloth seat on an outer surface thereof, to allow for independent attachment of a filter cloth to a filter plate.

The illustrative systems and methods for attaching filter cloths to a filter plate using a flanged cloth connector ring provides significant advantages over the prior art. The present invention allows a pair of filter cloths to be individually and independently installed on opposite side of a filter without requiring the filter cloths to be attached to each other. In this manner, one filter cloth can be removed and replaced without having to remove and replace the associated filter cloth, resulting in significant cost savings. The illustrative system is simple to manufacture and provides easy and fast installation of a filter cloth on a filter plate. Furthermore, the illustrative filter plate assembly allows for a central feed design, which has enhanced feed delivery over a corner feed design.

It is thus seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A filter assembly, comprising:
    a filter plate having an axially outer surface and a feed hole extending axially into the axially outer surface, the feed hole including a counter bore that defines a shoulder, and a radial groove formed in the counter bore adjacent to the shoulder;
    a liquid permeable filtering media having an axially inner surface abutting the axially outer surface of the filter plate for separating at least one solid from at least one liquid in a slurry, the filtering media having a feed hole formed therein that is coaxially aligned with the feed hole in the filter plate for allowing passage of a slurry into a filter chamber defined by an axially outer surface of the filtering media;
    a connector ring comprising a flange having flange radially inner section and a radially outer section, the radially inner section configured to receive an edge of the feed hole of the filtering media and the radially outer section being configured to receive an annular portion of the axially inner surface of the filtering media that surrounds the feed hole to connect the filtering media to the connector ring, wherein an annular portion of the axially outer surface of the filtering media adjacent the filtering media feed hole is substantially flush with an axially outer surface of the radially inner section of the connector ring, wherein the connector ring engages the radial groove in the filter plate feed hole to connect the connector ring to the filter plate; and
    a distribution ring to secure the filtering media and the connector ring to the filter plate, wherein the distribution ring includes a cylindrical portion having a radially outer surface that abuts a radially inner surface of the connector ring, an annular flange extending radially outwardly from an axially outer end of the cylindrical portion, the annular flange having an axially inner surface that abuts the axially outer surface of the radially inner section of the connector ring and the annular portion of the axially outer surface of the filtering media adjacent the filtering media feed hole, and the cylindrical portion including an annular inner axial surface that is adjacent to and spaced apart from the shoulder of the counter bore.

2. The filter assembly of claim 1, wherein the distribution ring is held by a press fit between the connector ring and the distribution ring.

3. The filter assembly of claim 1, wherein the connector ring further comprises a tab portion having a plurality of serrations, extending at an angle relative to the flange, and being configured to engage the groove in the filter plate counter bore, and wherein the plurality of serrations engage the distribution ring to retain the radially outer surface of the distribution ring in the filter cloth assembly.

4. The filter assembly of claim 1, wherein the distribution ring supports the connector ring at the feed hole to prevent pressure differentials from overflexing the filter plate.

5. The filter assembly of claim 1, wherein the distribution ring further comprises one or more radial slots formed in an axially outer face of the annular flange of the distribution ring to allow the slurry to enter the filter chamber.

6. The filter assembly of claim 1, wherein the connector ring further comprises a tab portion extending at an angle relative to the flange, wherein a radially outer surface of the tab portion engages the feed hole counter bore of the filter plate, and wherein the radially outer surface of the cylindrical portion of the distribution ring engages a radially inner surface of the tab portion to lock the connector ring into the filter plate.

7. The filter assembly of claim 1, further comprising:
    a positive seal between the distribution ring and the connector ring created by clamping the filter cloth assembly.

8. The filter assembly of claim 1, further comprising:
    a reinforcement unit attached to the filtering media to protect the filtering media from abrasion damage, a face of the reinforcement unit extending beyond the distribution ring.

\* \* \* \* \*